(12) United States Patent
Takeuchi et al.

(10) Patent No.: US 6,227,393 B1
(45) Date of Patent: *May 8, 2001

(54) BIAXIALLY STRETCHED BOTTLE HAVING CARRYING HANDLE

(75) Inventors: Setsuyuki Takeuchi; Nobukuni Ibe, both of Nagano-ken (JP)

(73) Assignee: A. K. Technical Laboratory, Inc., Nagano-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/016,772

(22) Filed: Jan. 30, 1998

(30) Foreign Application Priority Data

Jan. 31, 1997 (JP) .................................................. 9-018813

(51) Int. Cl.[7] .............................. B65D 1/02; B65D 23/10
(52) U.S. Cl. .......................... 215/398; 215/396; 220/771
(58) Field of Search .................................. 215/396–399; 220/771

(56) References Cited

U.S. PATENT DOCUMENTS

| | | | |
|---|---|---|---|
| 3,119,541 | * 1/1964 | Lynn | 215/399 X |
| 3,215,299 | * 11/1965 | Coanda et al. | 215/399 |
| 3,285,454 | 11/1966 | Bailey . | |
| 3,307,752 | * 3/1967 | Anderson | 220/771 X |
| 3,325,031 | * 6/1967 | Singier | 215/399 |
| 3,369,690 | * 2/1968 | Hayes | 220/771 X |
| 3,384,258 | * 5/1968 | Singier | 215/398 |
| 3,441,172 | 4/1969 | Dike | 215/398 |
| 3,481,501 | 12/1969 | Anderson . | |
| 3,620,410 | * 11/1971 | Griese, Jr. | 215/398 X |
| 4,231,605 | 11/1980 | Newman | 294/87.2 |
| 4,368,827 | * 1/1983 | Thompson | 215/398 |
| 4,372,454 | 2/1983 | Thompson | 215/398 |
| 4,395,378 | * 7/1983 | Alberghini et al. . | |
| 5,086,937 | * 2/1992 | Robinson | 215/398 |
| 5,385,269 | 1/1995 | Richter et al. | 222/105 |
| 5,704,507 | * 1/1998 | Krall et al. | 220/771 X |
| 5,785,203 | * 7/1998 | Arshinoff et al. | 220/771 X |
| 5,862,929 | * 1/1999 | Takeuchi et al. | 215/398 |

FOREIGN PATENT DOCUMENTS

| | | | |
|---|---|---|---|
| 789362 | * 7/1968 | (CA) | 215/399 |
| 3141794 | * 2/1983 | (DE) | 220/771 |
| 0 483 976 A1 | 10/1991 | (EP) . | |
| 0 732 187 A1 | 7/1995 | (EP) . | |
| 0 732 186 A1 | 9/1996 | (EP) . | |
| 0 732 187 A1 | 9/1996 | (EP) . | |
| 0 775 639 A1 | 5/1997 | (EP) . | |
| 1357096 | * 6/1974 | (GB) | 220/771 |
| 62-22925 | 2/1962 | (JP) . | |
| 6-20739 | 1/1994 | (JP) . | |
| 7-33840 | 6/1995 | (JP) . | |
| WO8202369 | 7/1982 | (WO) . | |

OTHER PUBLICATIONS

Practical Plastics Terms Dictionary, Oct. 15, 1977, English language translation of extracted part Magazine Plast 21, No. 45, Sep. 1995.

* cited by examiner

*Primary Examiner*—Sue A. Weaver
(74) *Attorney, Agent, or Firm*—Weingarten, Schurgin, Gagnebin & Hayes LLP

(57) ABSTRACT

A biaxially stretched bottle made of a thermoplastic resin having a carrying handle formed by integrally injection molding on the side of a lower neck portion of a preform at the same time when the preform is molded and applied as-formed as a carrying handle of a thin-wall bottle formed by stretch blow molding, wherein the carrying handle is formed with its arm portions extending across the both sides of the neck portion, enabled to rotate up and down with respective joining portions of base portions and the arm portion which are formed in symmetrical positions on both sides of the neck portion as its axis. This enables the change in the position of a gripping portion, which has been difficult in conventional integral forming, even in a bottle made of a material resin like PET resin which lacks in flexibility.

6 Claims, 4 Drawing Sheets

BIAXIALLY STRETCHED BOTTLE HAVING CARRYING HANDLE

BACKGROUND OF THE INVENTION

1. Field of the Invention

The present invention relates to a biaxially stretched bottle in which a carrying handle injection molded integrally with a preform on the side of a lower neck portion thereof is applied as-formed as a handle of the bottle.

2. Background Art

A biaxially stretched bottle represented by a bottle made of polyethylene terephthalate, so-called PET bottle is formed by stretch blowing an injection molded preform from a lower portion of a neck portion thereof to a bottom portion thereof in length and width so as to have a thin wall. From these reasons, unlike a thick-wall bottle formed by blowing a parison made by extrusion molding, it is considered infeasible that a body portion thereof is transformed in part to a handle on blow-molding using a mold, or as described in U.S. Pat. No. 3,441,172, a carrying handle is formed integrally by pressing on a shoulder portion of a bottle.

Therefore, usually when a bottle is stretch blow molded, a handle is inserted into a lower neck portion of a preform, or a handle separately injection molded is inserted into a blow mold to attach to the side of a body portion thereof.

In some cases, apart from integration of a handle and a bottle by inserting, a handle is attached to a bottle by using fitting means after a bottle is formed. However, in both cases, compared with common method of production of a bottle having no handle, facilities cost is increased because a preform and a handle have to be made separately and problems remain unsolved with respects to yield.

These problems can be solved by forming a handle integrally with a preform. However, there still remains other problems in which the position where a handle is formed is limited within a lower neck portion, the shape of which does not change on forming of a bottle, and the shape of a handle is also limited because as mentioned earlier, on stretch blow molding a preform is stretched along its axis except for a neck portion.

For example, the handle described in WO82/02369 is belt-shaped and integrally formed horizontally on one side of a lower neck portion of a preform at the same time when the preform is injection molded, and has elliptical holes to enable plural fingers to be inserted thereinto. Accordingly, this is only a simple handle for carrying a bottle, rather than a handle for supporting a bottle firmly in a lateral portion.

A bottle having such a simple carrying handle is also described in U.S. Pat. No. 4,372,454. However, the known carrying handle is made thick to have a certain strength, and finds difficulty in bending because, unstretched together with a neck portion it is hard and lacks in flexibility, especially when a material resin is polyethylene terephthalate (PET). The carrying handle would not bend vertically even when provided with a groove for folding, and a bottle hangs obliquely.

SUMMARY OF THE INVENTION

In the present invention, arm portions of a carrying handle are formed on the both sides of a neck portion of a preform extending across a neck portion, though like well-known carrying handles it is formed integrally with a neck portion at the same time when a preform is injection molded. This makes it possible that a carrying handle rotates up and down around a border with a base portion as its axis, while it is formed horizontally together with a base portion. Thus, the present invention provides a novel biaxially-stretched bottle having a carrying handle, wherein change in the position of a gripping portion of a carrying handle, while difficult in a conventional handle made by integral forming, becomes feasible even in a bottle made of a material resin which lacks in flexibility, and in addition to hanging a bottle in almost vertical position, natural change in the position of a gripping portion of a carrying handle is feasible according to the tilting of a bottle on pouring its content.

By thinning a joining portion between a base portion protruding on both sides of a neck portions and arm portions connecting to both portions, the present invention solves a problem that a portion from arm portions to a gripping portion lacks in flexibility, though a carrying handle is integrally formed long sideways on the side of a neck portion. At the same time, the present invention provides a novel biaxially-stretched bottle having a carrying handle, a joining portion of which is toughened by thinning to withstand repeated bending.

Furthermore, it becomes possible by the present invention that the direction of a bottle is naturally defined for pouring even in a large-size bottle used for a container of water or oil by specifically defining the position of base portions to be integrally molded with a preform. Also, the present invention provides a novel biaxially-stretched bottle having a carrying handle, in which on pouring a corner of a bottle is positioned downwardly by specifying the direction of a carrying handle in case of a bottle with an angular-shaped body portion.

For the above purpose, the present invention provides a biaxially-stretched bottle made of a thermoplastic resin having a carrying handle formed by integrally injection molding on the side of a lower portion of a neck portion of a preform at the same time when the preform is molded and applied as-formed as a carrying handle of a thin-wall bottle formed by stretch blow molding, wherein the above carrying handle has a gripping portion and a pair of arm portions formed integrally in U-shape, a pair of the arm portions are formed integrally to continue with base portions composed of protruding pieces which are formed in a symmetrical position on both sides of the neck portion and are made longer than the neck portion in axial dimension, thereby extending outwardly across the neck portion, and joining portions of the base portions with the arm portions are locally contracted its thickness into thin wall, thereby providing flexible joining portions which enable to fold up and down.

In addition, the above base portions are formed off center line of the bottle in symmetrical positions on both sides of the neck portion, and the deviation of the positions of the base portions makes the bottle so slightly tilted when hanged that the edge of a mouth on the neck portion opposite to the carrying handle provides a pouring side. Furthermore, the gripping portion and a pair of the arm portions possess flexibility due to molecular orientation of a resin on forming of the joining portions by contracting borders of the above base portions and the arm portions.

Furthermore, when a body portion of the bottle is formed in angular shape, the above carrying handle is formed toward a corner of the bottle so that a corner opposite to the carrying handle provides a pouring side.

The above bottle may be made of a thermoplastic resin comprising polyester resins such as polyethylene terephthalate (PET) and polyethylene naphthalate (PEN) and thermoplastic resins such as polypropylene. In case of a biaxially stretched bottle made of a polyester resin, flexibility due to molecular orientation of a resin by thinning of the above joining portion is endowed to a carrying handle even when as injection molded. Thereby, the joining portions as well as the gripping portion and arm portions increase in bending strength and impact strength and find difficulty in breaking. Furthermore, in case of polypropylene, its flexibility is further enhanced.

In such a biaxially-stretched bottle having a carrying handle, since a carrying handle formed across both sides of a neck portion can be folded up and down at thin-wall joining portions the carrying handle is naturally bent around the thin-wall joining portions due to the weight of the bottle when hanged making the carrying handle in a vertical direction by rotating upwardly with the joining portions as its axis, though the carrying handle is positioned sideways and thereby the bottle can be hanged.

Furthermore, it is easy to judge that the edge of a mouth on the neck portion opposite to the carrying handle is a pouring side because the base portion of the carrying handle is in an eccentric position. Thereby, its content is easy to pour even from a heavy, large-size bottle for water or oil by supporting the bottom portion on the side of the carrying handle because pouring is carried out by tilting a bottle with an edge of the mouth on the neck portion downwards.

BRIEF DESCRIPTION OF THE DRAWINGS

These objects and advantages of the present invention will become clear from the following description with reference to the accompanying drawings, wherein.

DETAILED DESCRIPTION OF THE PREFERRED EMBODIMENTS

Figure 1:
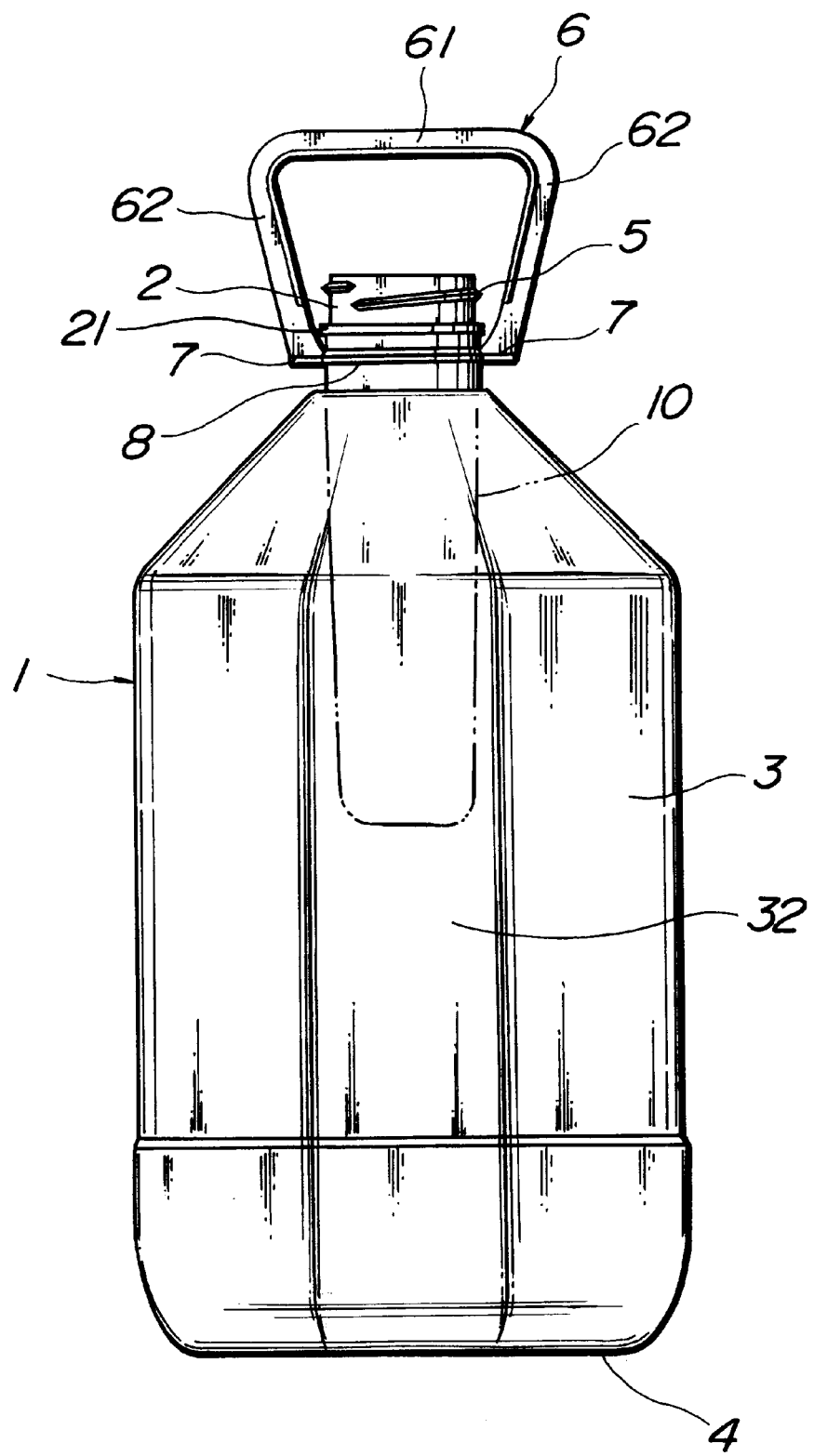
FIG. 1 illustrates a front view of a biaxially-stretched bottle with a carrying handle according to an embodiment of the present invention.

In the Figures, reference numeral 1 designates an angular-shaped PET bottle formed by biaxially stretching from a lower portion of a neck portion 2 to a body portion 3 and a bottom portion 4 to have a thin wall. A carrying handle 6 is integrally formed on a side surface of the lower neck portion 2 below a screw thread 5 on an outer periphery of the neck portion 2.

The carrying handle 6 injection molded integrally with a preform 10 is applied as-formed as a carrying handle 6 of the bottle 1. The carrying handle 6 composed of a grip portion 61 in which an inner edge is formed widely enough to be a working edge, and a pair of arm portions 62, 62 formed on both sides is of U-shape in plane, integrally formed flatly from a long and narrow piece.

The above arm portions 62, 62 which are longer than the neck portion 2 in axial dimension are integrally formed with base portions 7, 7 of protruding pieces formed in symmetrical positions on both sides of the neck portion 2, thereby providing the carrying handle 6 extending in length outwardly across both sides of the neck portion 2.

The base portions 7, 7 extend radially in width and in the same thickness as the arm portions 62 from a radial ring 8 protruding in a predetermined spacing downward from a support ring 21 which protrudes around the outer circumference of the neck portion 2. A border of the base portion 7 and the arm portion 62 provides a joining portion 9 allowing to fold up and down freely since it is formed into a thin wall by contracting locally its thickness. In case of a bottle having no support ring 21, a radial ring 8 is formed beneath a screw thread 5, thereby providing base portions 7, 7.

There is no problem if forming positions of the extending base portions 7, 7 is on the center line of a main body of the bottle. However, considering the pouring operation of a content, it is preferable that forming positions of the base portions 7, 7 are off center line of the bottle in symmetrical positions on both sides of the neck portion near the center line X—X, and the deviation of the positions of the base portions 7,7 makes the bottle so slightly tilted when hanged that a user will be able to easily notice that the edge of a mouth on the neck portion opposite to the carrying handle 6 provides a pouring side even when the carrying handle 6 is positioned vertically across the mouth on the neck portion.

Figure 2:
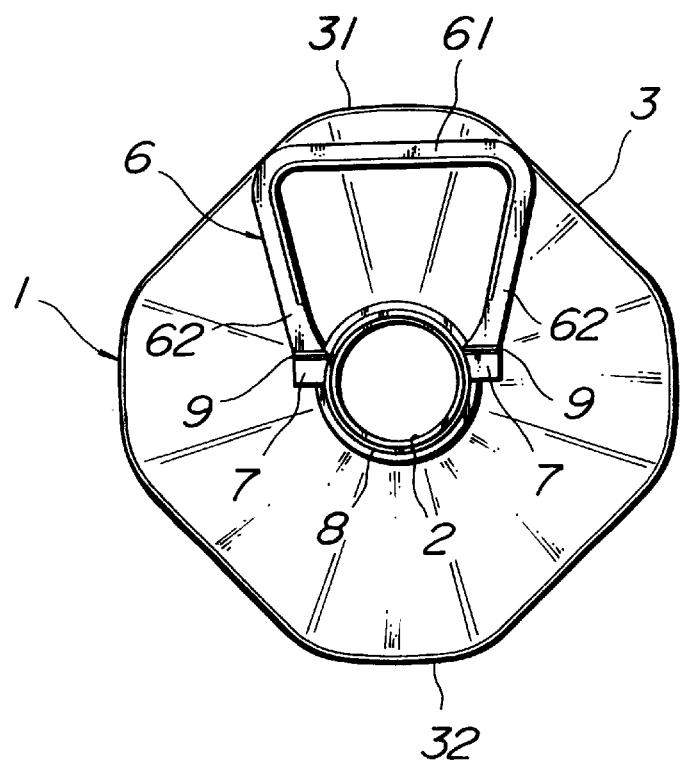
FIG. 2 shows a plan view of FIG. 1.
Figure 3:
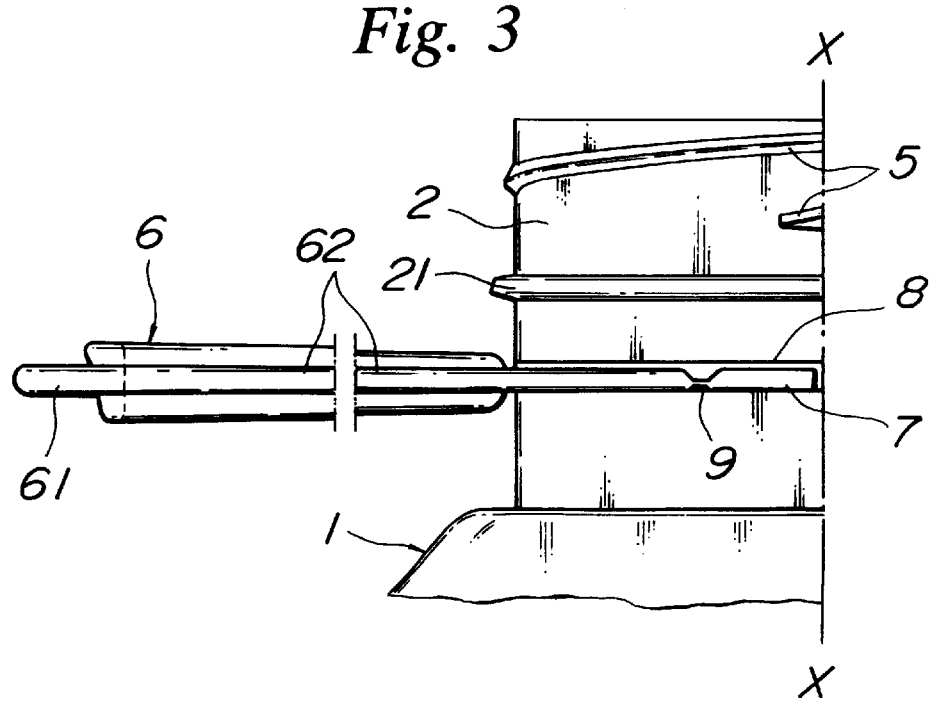
FIG. 3 shows an enlarged side view of half a neck portion.

When a body portion 3 of a bottle 1 is angular-shaped and directional, it is also preferable that as shown in FIG. 2, a carrying handle is formed toward any corner 31 of the bottle. In this case, a corner 32 opposite to the carrying handle 6 is positioned downward on pouring. It is easy to pour its content in a small residual quantity because the corner 32 positioned downward acts like a gutter in which the content becomes voluminous.

Figure 6:
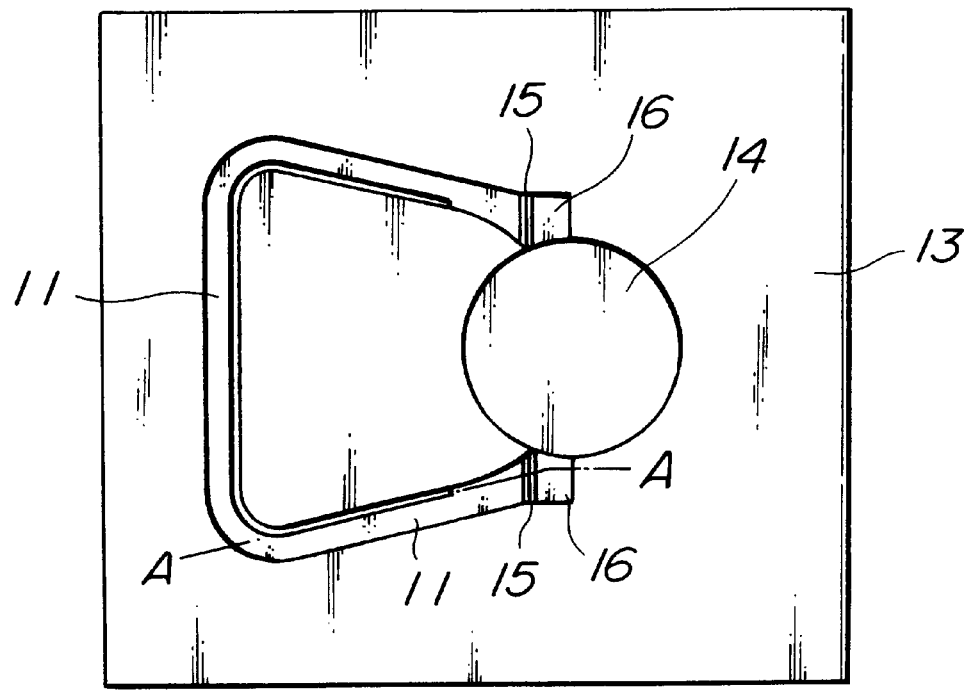
FIG. 6 shows a plan view of a forming mold of a body portion of a preform illustrating a cavity for injection molding of a carrying handle.
Figure 7:
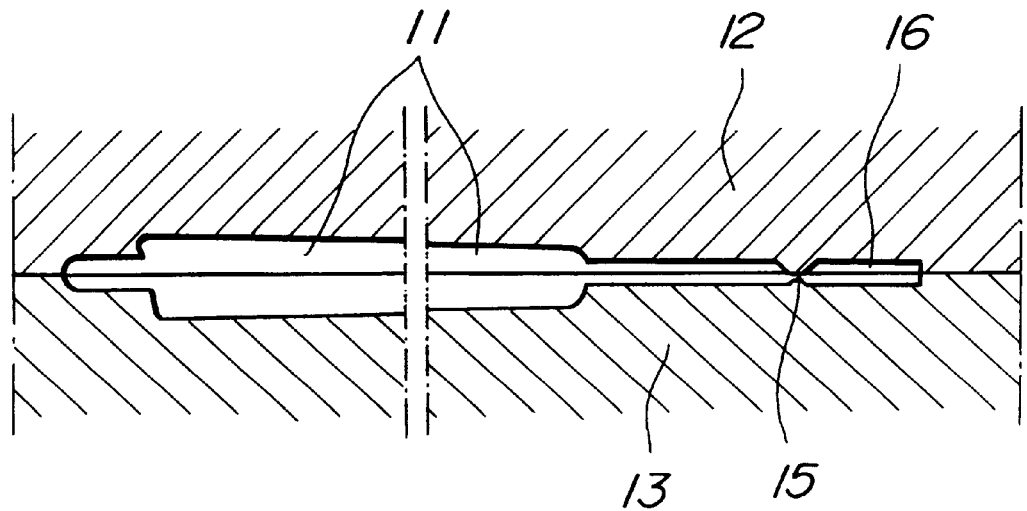
FIG. 7 shows a cross-sectional view taken along A—A position of FIG. 6 in which a neck forming mold and a body forming mold are in a closed state.

Thinning of the joining portion 9 by contracting the border of the base portion 7 and the arm portion 62 is performed on injection molding of the carrying handle 6. As shown in FIGS. 6 and 7, a flat cavity 11 for a carrying handle which forms a carrying handle 6, covers a parting plane of both a neck forming mold 12 and a body forming mold 13 for molding a preform 10 and is connected with a cavity 14 for a body portion. The position in which the above joining portion 9 is formed in the cavity 11 for a carrying handle, is provided in a contracted portion which forms a flow spacing 15 by matching of respective mold planes, thereby forming a cavity 16 for a base portion.

The dimension of the flow spacing 15 for forming the joining portion 9 may preferably be 0.5 mm or less.

Figure 5:
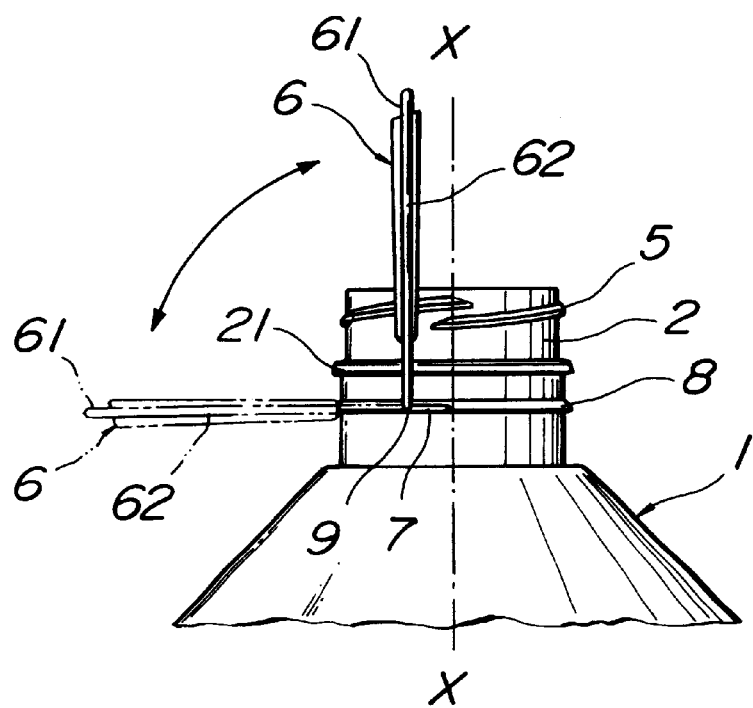
FIG. 5 shows a side view of an upper portion of a bottle illustrating the rotary motion of a carrying handle.

A molten resin passes from the side of the cavity 16 for a base portion via the flow spacing 15 into the cavity 11 for a carrying handle. Molecular orientation of the resin is carried out by passing through the flow spacing 15 with a limited size, thereby providing flexibility with a resin which forms the joining portion 9 and the carrying handle 6. Particularly, by thin-wall forming, the joining portion 9 is toughened enough to withstand bending stress. Thereby, the carrying handle folds at the joining portion 9 and rotates up and down smoothly with the joining portion 9 as its axis (see FIG. 5).

Figure 4:
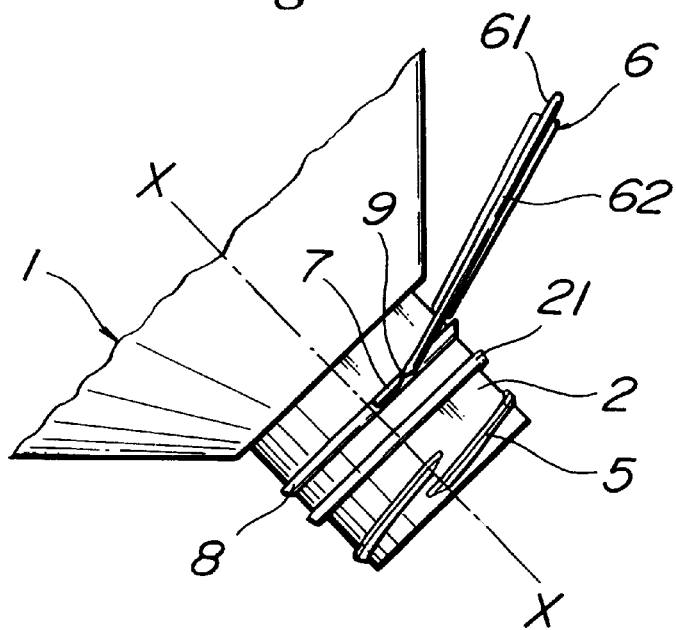
FIG. 4 shows a side view of an upper portion of a bottle illustrating the position of a carrying handle on pouring.

Thus, the carrying handle 6, though extending horizontally in length toward the outward of the neck portion 2 on forming, is usable as a carrying handle 6 extending vertically across the mouth on the neck portion as shown in FIG. 4. When the carrying handle 6 is gripped by one hand with the bottom portion 4 of the bottle 1 supported by the other hand to tilt the bottle with an edge of the mouth on the neck portion downwards to pour its content, the carrying handle 6 naturally folds and rotates moving obliquely toward the position shown in FIG. 4. Thereby, the carrying handle 6 would not resist against tilting of the bottle so that even a heavy bottle ranging from 3 litters to 5 litters is easy to pour.

In the above embodiments, the carrying handle 6 is U-shaped in plane. However, since the shape can be set up arbitrarily so far as it is basically U-shaped, the shape of the carrying handle 6 in the present invention is not limited within the ones illustrated. Furthermore, a cross section of the carrying handle 6 and the base portions 7 is not limited to be planar shape because circular and other shapes are possible.

[Example]

Bottle for cooking oil: 5 litters (angular-shaped)
Material resin: polyethylene terephthalate
Height of a neck portion: 35 mm
Outer diameter of a neck portion: 42 mm
Total length of a carrying handle: 66 mm
Width of a carrying handle (grip side): 85 mm
Width of a carrying handle (base portion side): 63 mm
Breadth of a carrying handle and a base portion: 7.0 mm
Thickness of a carrying handle and a base portion: 1.5 mm
Length of a protruding piece of a base portion: 8.0 mm
Length of a joining portion: 2.0 mm
Thickness of a joining portion: 0.5 mm While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. A biaxially stretched bottle made of a polyester resin having a carrying handle formed by integrally injection molding on the side of a lower portion of a neck portion of a preform at the same time when the preform is molded and applied as-formed as a carrying handle of a thin-wall bottle formed by stretch blow molding, characterized in that said carrying handle has a gripping portion and a pair of arm portions formed integrally in U-shape, the pair of the arm portions being formed integrally to continue with base portions respectively composed of a protruding piece which are formed in symmetrical positions on both sides of the neck portion, the arm portions being longer than the neck portion in axial dimension, thereby extending outwardly across the neck portion, and the arm portions being joined by joining portions to the base portions, the joining portions being locally contracted in thickness into thin wall so as to provide molecular orientation to each joining portion, each arm portion and the gripping portion, such that the carrying handle can be flexibly folded up and down.

2. A biaxially stretched bottle according to claim 1, wherein the bottle is substantially symmetric about a center line extending in an axial direction, and wherein said base portions are formed off the center line of the bottle in a symmetrical position on both sides of the neck portion, and deviation of the positions of the base portions makes the bottle so slightly tilted when hung that the edge of a mouth on the neck portion opposite to the carrying handle provides a pouring side.

3. A biaxially stretched bottle according to claim 2, wherein said bottle includes a body portion which is formed in angular shape having opposite corners, and wherein the carrying handle is formed toward one of the corners so that an opposite corner provides a pouring side.

4. A biaxially stretched bottle according to claim 1, wherein said bottle includes a body portion which is formed in angular shape having opposite corners, and wherein the carrying handle is formed toward one of the corners so that an opposite corner provides a pouring side.

5. A biaxially stretched bottle according to claim 1, wherein the polyester resin is polyethylene terephthalate.

6. A biaxially stretched bottle according to claim 1, wherein the polyester resin is polyethylene naphthalate.

* * * * *